Jan. 10, 1967   A. J. DE MASTRY ET AL   3,296,694

METHOD OF FABRICATING A FASTENER UNIT

Filed March 5, 1964

INVENTORS
Anthony J. DeMastry &
BY Julius A. Guggenaster

Herbert Furman
ATTORNEY

United States Patent Office 3,296,694
Patented Jan. 10, 1967

3,296,694
METHOD OF FABRICATING A FASTENER UNIT
Anthony J. De Mastry and Julius A. Guggenaster, Columbus, Ohio, assignors to General Motors Corporation, Detroit, Mich., a corporation of Delaware
Filed Mar. 5, 1964, Ser. No. 349,603
5 Claims. (Cl. 29—520)

This invention relates to a method of fabricating a fastener unit and more particularly to a method of mounting a metal sleeve on a reduced diameter portion of a fastener member.

One feature of this invention is that it provides an improved method of mounting a metal sleeve on a reduced diameter portion of a fastener member which is located intermediately of a pair of spaced annular ribs of the member. Another feature of this invention is that the metal sleeve is initially of a size sufficient to pass over one of the ribs and is thereafter reduced in size so as to tightly grip the annular portion of the fastener member. A further feature of this invention is that one portion of the metal sleeve is initially reduced in diameter and extruded onto the annular portion of the fastener member in engagement with one of the ribs and thereafter the remaining portion of the metal sleeve is reduced in size and extruded onto the annular portion of the fastener member so that the sleeve tightly grips the annular portion. Yet another feature of this invention is that the length of the metal sleeve is initially less than the length of the annular portion and the reduction in size of the metal sleeve increases the length thereof to substantially that of the annular portion so that the metal sleeve extends substantially over the entire annular portion and to adjacent each of the ribs. Yet a further feature of this invention is that the annular portion of the fastener member is provided with a resilient sleeve or bushing and the metal sleeve is extruded onto the resilient sleeve or bushing.

These and other features of this invention will be readily apparent from the following specification and drawings wherein.

The fastener unit of this invention is intended for use as a striker adapted to be mounted on a portion of an automobile body and engaged by a fork-type bolt of a vehicle door latch assembly mounted on a body closure so as to retain the closure in closed position. Since the fastener member is of metal and the latch bolt is also of metal, it is desirable that a cushioning means be provided between the fastener member and the bolt to reduce the noise attendant with engagement and disengagement of the bolt and fastener member to a minimum. It is also desirable that the bolt engage a portion of the striker member of metal so that wear is also reduced to a minimum. The fastener fabricated by the method of this invention accomplishes these purposes by having an annular portion thereof covered by a resilient sleeve or bushing, with this sleeve or bushing being thereafter covered by a metal sleeve which is engageable with the latch bolt and is held against both radial and axial movement relative to the resilient sleeve. Thus, the metal sleeve is insulated from the fastener member so that noise is reduced to a minimum and wear of the parts is also reduced to a minimum.

Figure 1:
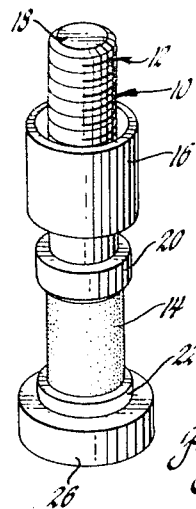
FIGURE 1 is an exploded view of the fastener unit showing the fastener member and metal sleeve prior to assembly.
Figure 2:
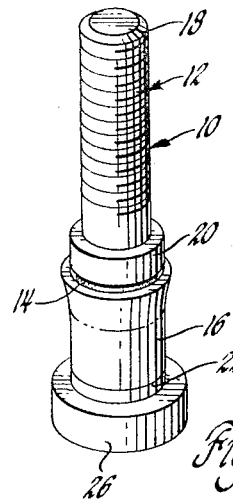
FIGURE 2 is a view similar to FIGURE 1 showing the fastener unit after the first extrusion step wherein a portion of the metal sleeve is reduced in diameter and extruded onto the fastener member.
Figure 3:
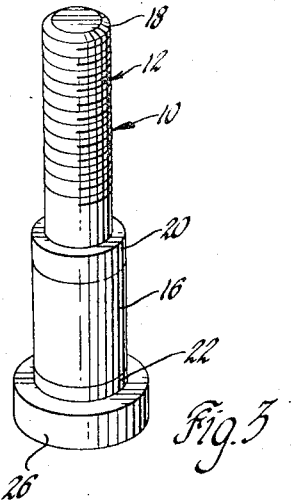
FIGURE 3 is a view showing the fastener unit after the second extrusion step wherein the other portion of the metal sleeve is reduced in size and extruded onto the fastener member.
Figure 7:
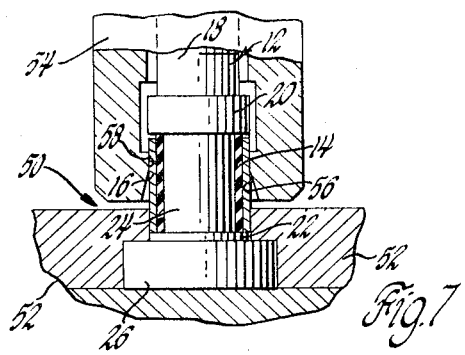
FIGURE 7 is a view showing the fastener unit after the second extrusion step.

Referring now to FIGURE 3 of the drawings, the fastener unit 10 generally comprises a fastener member 12, a rubber or resilient sleeve or bushing 14, FIGURE 7, mounted on the fastener member, and a metal sleeve 16 which is mounted on the fastener member over the rubber bushing. The fastener member includes a threaded shank 18 and annular ribs 20 and 22 which are spaced relative to each other and located to each side of a reduced diameter portion 24, FIGURE 4. The annular rib 22 is located immediately adjacent the head 26 of the fastener member which may be provided with suitable depressions or sides so that the fastener unit may be screwed into its support.

The rubber bushing 14 is mounted on the reduced diameter portion 24 of the fastener member in various known manners and it will be noted that this bushing has an outer diameter less than the diameter of the ribs 20 or 22. The metal sleeve 16 has an initial inner diameter which is slightly greater than the outer diameter of the ribs 20 and 22 and has an initial length less than the distance between the ribs 20 and 22 or the length of the rubber bushing 14.

Figure 4:
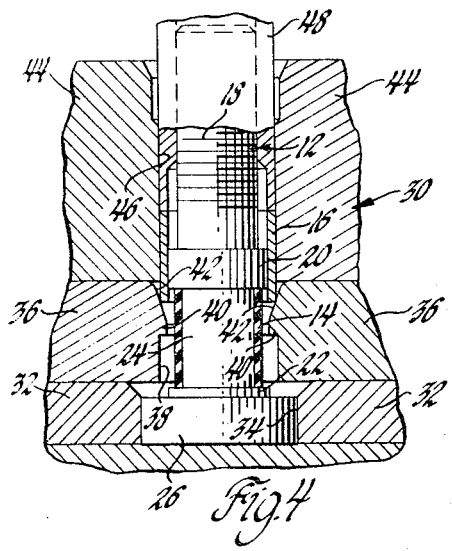
FIGURE 4 is a sectional view of an apparatus for extruding the one portion of the metal sleeve onto the fastener member and showing the fastener unit prior to the first extrusion step.
Figure 5:
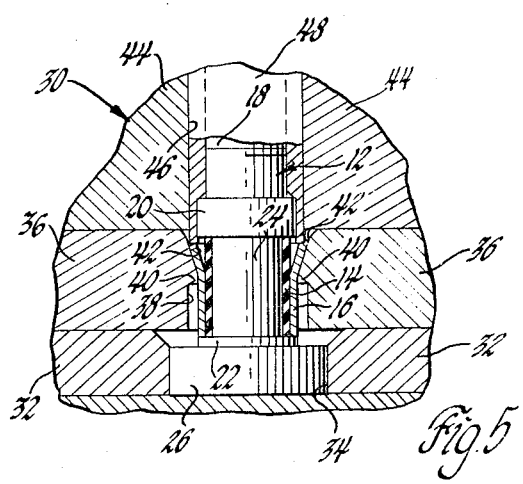
FIGURE 5 is a view similar to FIGURE 4 and showing the fastener unit after the first extrusion step.

In order to mount the metal sleeve 16 on the fastener member intermediate the ribs 20 and 22 and over the rubber bushing 14, the fastener member 12 is first mounted in a suitable die or apparatus generally designated 30 in FIGURES 4 and 5. The apparatus 30 includes a pair of oppositely movable jaws or members 32 which define with the base or die plate of the apparatus a cavity 34 adapted to receive the head portion 26 and rib 22 of the fastener member therein, with the jaws 32 tightly gripping the head portion 26 to locate the fastener member within the apparatus 30. The apparatus 30 further includes a pair of oppositely movable jaws or members 36 which define a cavity 38 receiving one portion of the sleeve 14 and portion 24 of the fastener member therewithin, with the jaws 36 further including ribs 40 which define a restricted opening of a size substantially equal to the diameter of the rib 20. Ribs 40 include lead-in or ramp surfaces 42 which define a tapered bore or cavity. The apparatus 30 also includes a pair of movable jaws or members 44 which define a cavity 46 of a diameter substantially equal to the outer diameter of the metal sleeve 28.

The fastener member is first loaded into the apparatus 30 and the jaws 32, 36 and 44 are thereafter closed so as to locate the fastener member within the apparatus. The metal sleeve 16 is thereafter loaded into the apparatus 30 and it passes through the cavity 46 until it engages the annular surfaces 42 of the ribs 40 as shown in FIGURE 4. Thereafter a hollow punch 48 of the apparatus 30 engages the upper or outer end of the sleeve 16 as shown in FIGURE 4 and upon depression of the punch 48 within the cavity 46, the metal sleeve 16 is forced through the opening of the ribs 40 so that the outer diameter of a portion thereof is reduced in size to that of the rib 20 as this portion is extruded onto the portion of the rubber bushing 14 within the cavity 38 in tight gripping engagement therewith, with the lower or inner end of the sleeve engaging the rib 22, FIGURE 5.

Figure 6:
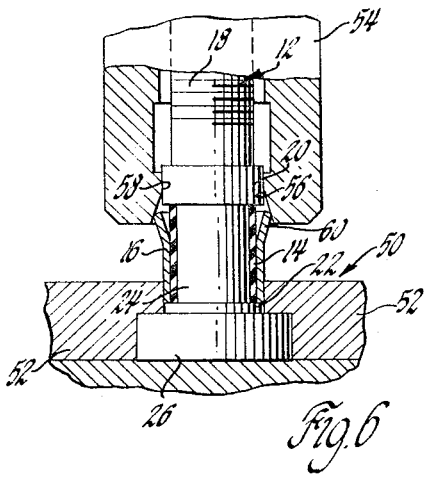
FIGURE 6 is a sectional view of an apparatus for extruding the remaining portion of the metal sleeve onto the fastener member and showing the fastener unit prior to the second extrusion step.

Thereafter the fastener member and partially extruded sleeve 16 are removed from the apparatus 30 and placed in an apparatus 50, FIGURES 6 and 7, which generally includes a pair of movable jaws or members 52 which tightly grip the head 26 and rib 22 of the fastener member and the extruded portion of the sleeve 16 when these jaws or movable members are closed. A hollow punch 54 of the apparatus 50 includes a lower annular inwardly extending rib which defines a ramp or tapered surface 56 and an annular opening 58, the diameter of which is substantially equal to that of the rib 20. When the punch 54 is lowered, the surfaces 56 and 58 move past the flared portion 60 of the metal sleeve 16, which results from the first extrusion step, and extrudes this portion onto the rubber bushing 14, as shown in FIGURE 7. Thereafter the fastener member and its assembled sleeve are removed from the apparatus 50.

If desired, the fastener unit and its assembled sleeve may be placed in a further apparatus to resize the sleeve.

Since the metal sleeve 16 is reduced in diameter and extruded onto the rubber bushing 14, the length of the metal sleeve is increased and substantially equals the distance between the ribs 20 and 22 so as to substantially completely cover the rubber bushing 14 after assembly. The opposite ends of the sleeve are located adjacent to or in engagement with the ribs 20 and 22, as desired.

It will be apparent that although the ribs 20 and 22 are shown of the same diameter, the rib 22 may be of greater diameter than the rib 20 or it may be dispensed with entirely and the rubber bushing may engage the head portion 26 of the fastener member if desired.

Thus, this invention provides an improved method of mounting a metal sleeve on a reduced diameter portion of a fastener member.

We claim:

1. A method of fabricating a fastener unit comprising, forming a fastener member with an axially extending annular portion bounded by spaced annular radially projecting ribs, forming an annular sleeve of a size sufficient to permit said sleeve to be moved past one of said ribs and a length less than the distance between said annular ribs, moving said sleeve past said one rib and over said annular portion, extruding one portion of said sleeve onto said annular portion and thereby increasing the length of said sleeve, and extruding the other portion of said sleeve onto said annular portion and thereby further increasing the length of said sleeve, the over-all length of said sleeve after extrusion being substantially equal to the distance between said annular ribs and said sleeve extending therebetween in tight engagement with said annular portion of said fastener member.

2. A method of fabricating a fastener unit comprising, forming a fastener member with an axially extending annular portion bounded by spaced annular radially projecting ribs, forming an annular sleeve of a size sufficient to permit said sleeve to be moved past one of said ribs and a length less than the distance between said annular ribs, moving said sleeve past said one rib and over said annular portion while extruding one portion of said sleeve onto said annular portion and into engagement with the other of said ribs, and extruding the other portion of said sleeve onto said annular portion, extrusion of said sleeve increasing the length of said sleeve so that the over-all length of said sleeve after extrusion substantially equals the distance between said annular ribs and said sleeve extends therebetween in tight engagement with said annular portion of said fastener member.

3. A method of fabricating a fastener unit comprising, providing a fastener member with an annular portion bounded by spaced annular projecting ribs, forming an annular sleeve with an inner diameter substantially equal to the outer diameter of one of said ribs and a length less than the distance between said annular ribs, moving said sleeve past said one rib and into engagement with said other rib while reducing the outer diameter of a portion of said sleeve to that of said one rib and the inner diameter thereof to that of said annular portion, and reducing the outer diameter of the other portion of the sleeve to that of said one rib and the inner diameter thereof to that of said annular portion, the reduction in diameter of said sleeve increasing the length of said sleeve so that the over-all length of said sleeve after reduction equals the distance between said annular ribs and said sleeve extends substantially the full distance therebetween over said annular portion of said fastener member.

4. A method of fabricating a striker member comprising, providing a fastener member with an annular portion including a resilient sleeve and an annular radially projecting rib located adjacent each end of said resilient sleeve and of a diameter greater than the diameter of said sleeve, forming an annular metal sleeve with an inner diameter substantially equal to the outer diameter of one of said ribs and a length less than the distance between said annular ribs, moving said metal sleeve past said one rib and into engagement with said other rib while reducing the outer diameter of a portion of said sleeve to that of said one rib and the inner diameter thereof to that of said resilient sleeve, and reducing the outer diameter of the other portion of said metal sleeve to that of said one rib and the inner diameter thereof to that of said resilient sleeve, the reduction in diameter of said metal sleeve increasing the length thereof so that the over-all length of said metal sleeve after reduction equals the distance between said annular ribs and said sleeve extends substantially the full distance therebetween over said resilient sleeve of said fastener member.

5. A method of fabricating a striker unit comprising, providing a fastener member with an annular portion bounded by an annular radially projecting rib, locating the annular portion of said member within the cavity of a forming die having a restricted opening thereto, said opening being located adjacent said rib, and having a diameter substantially equal to the diameter of said rib, forming an annular sleeve of a length less than that of said annular portion and an inner diameter substantially equal to the outer diameter of said rib, positioning said sleeve over said rib and in engagement with said forming die adjacent the opening therein, forcing a portion of said sleeve through said die opening to reduce the outer diameter thereof to that of said rib and extrude said portion onto the annular portion of said fastener member, and thereafter reducing the outer diameter of the remaining portion of said sleeve to that of said rib and extruding said remaining portion onto said annular portion of said fastener member, the reduction in diameter of said sleeve increasing the length thereof to substantially that of said annular portion.

References Cited by the Examiner

UNITED STATES PATENTS

| | | | |
|---|---|---|---|
| 1,614,606 | 1/1927 | Esterow | 29—520 X |
| 1,674,258 | 6/1928 | Obergfell et al. | 85—1 X |
| 2,509,006 | 5/1950 | Lynn. | |
| 2,536,821 | 1/1951 | Rappl. | |
| 2,987,336 | 6/1961 | Kramer | 292—341.12 X |

CHARLIE T. MOON, *Primary Examiner.*